(12) United States Patent
Chung et al.

(10) Patent No.: US 10,564,734 B1
(45) Date of Patent: Feb. 18, 2020

(54) PEN MOUSE WITH A TRACING COMPENSATION FUNCTION

(71) Applicant: PixArt Imaging Inc., Hsin-Chu (TW)

(72) Inventors: Ching-Lin Chung, Hsin-Chu (TW); Chia-Fu Ke, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/109,752

(22) Filed: Aug. 23, 2018

(51) Int. Cl.
*G06F 3/0354* (2013.01)
*G06F 3/038* (2013.01)
*G06F 3/0346* (2013.01)

(52) U.S. Cl.
CPC ........ *G06F 3/03542* (2013.01); *G06F 3/0346* (2013.01); *G06F 3/0383* (2013.01); *G06F 3/0386* (2013.01)

(58) Field of Classification Search
CPC .. G06F 3/03542; G06F 3/0346; G06F 3/0386; G06F 3/0383
See application file for complete search history.

(56) References Cited

U.S. PATENT DOCUMENTS

| | | | | |
|---|---|---|---|---|
| 5,170,047 A * | 12/1992 | Beauchamp | .......... | B43L 13/024 250/202 |
| 2002/0148655 A1* | 10/2002 | Cho | .................... | G06F 3/03542 178/18.09 |
| 2004/0032392 A1* | 2/2004 | Chi | .................... | G06F 3/03546 345/156 |
| 2004/0164972 A1* | 8/2004 | Carl | .................... | G06F 3/0325 345/179 |
| 2005/0073508 A1* | 4/2005 | Pittel | ..................... | G06F 1/3203 345/175 |
| 2007/0024600 A1* | 2/2007 | Chang | .................. | G06F 3/0317 345/179 |
| 2007/0152971 A1* | 7/2007 | Chang | .................. | G06F 3/0317 345/166 |
| 2010/0013860 A1* | 1/2010 | Mandella | ................ | G01B 21/04 345/650 |
| 2011/0037699 A1* | 2/2011 | Kim | ...................... | G06F 3/0317 345/166 |
| 2011/0128258 A1* | 6/2011 | Liang | .................. | G06F 3/03545 345/180 |
| 2012/0013578 A1* | 1/2012 | Huang | ................ | G06F 3/03545 345/179 |
| 2012/0218185 A1* | 8/2012 | Chen | .................... | G06F 3/03543 345/163 |
| 2016/0154484 A1* | 6/2016 | Kampf | ................ | G06F 3/03545 345/179 |

(Continued)

FOREIGN PATENT DOCUMENTS

WO    WO2014009933 A1 *    1/2014

*Primary Examiner* — Nitin Patel
*Assistant Examiner* — Amy Onyekaba
(74) *Attorney, Agent, or Firm* — Winston Hsu

(57) ABSTRACT

A pen mouse with a tracing compensation function includes an optical navigation module, an angle detector and a processor. The optical navigation module is adapted to generate coordinates of the pen mouse. The angle detector is adapted to detect an inclination angle of the pen mouse. The processor is electrically connected to the optical navigation module and the angle detector, and adapted to transform the inclination angle into a compensation parameter and further to compute a trace of the pen mouse via computation of the coordinates by the compensation parameter.

15 Claims, 3 Drawing Sheets

(56) References Cited

U.S. PATENT DOCUMENTS

2016/0209936 A1* 7/2016 Song .................... G06F 3/0317
2017/0102790 A1* 4/2017 Chung ................ G06F 3/03542
2017/0364167 A1* 12/2017 Ribeiro .................. G06F 3/016

* cited by examiner

PEN MOUSE WITH A TRACING COMPENSATION FUNCTION

BACKGROUND OF THE INVENTION

1. Field of the Invention

The present invention relates to a pen mouse, and more particularly, to a pen mouse with a tracing compensation function.

2. Description of the Prior Art

A conventional optical pen mouse utilizes an optical navigation chip disposed on a pen head to read a moving trace of the pen head on a reference plane. The moving trace is transmitted to an external electronic device and can be displayed on a screen. The optical navigation chip is disposed inside the pen head of normal and acceptable look; when the optical pen mouse is handled for writing characters or drawing patterns, the pen tube of the optical pen mouse is inclined relative to the reference plane, and the optical navigation chip is slightly oblique relative to the reference plane because of an inclination angle. As the optical pen mouse is operated to draw a horizontal line on the reference plane, a line displayed on the screen is oblique than the horizontal line.

For solving the above-mentioned mistake, the conventional optical pen mouse disposes the optical navigation chip obliquely inside the pen head to overcome the mistake of the drawing line being inconsistent with the digital line displayed on the digital image. However, the inclination angle generated by handling the optical pen mouse is varied according to a palm size, a posture habit and a writing environment of the user. Handwriting deviation (such like inconsistency of the drawing line and the digital line displayed on the digital image) cannot be effectively overcome by conventional hardware calibration of disposing the optical navigation chip obliquely inside the pen mouse.

SUMMARY OF THE INVENTION

The present invention provides a pen mouse with a tracing compensation function for solving above drawbacks.

According to the claimed invention, a pen mouse with a tracing compensation function includes an optical navigation module, an angle detector and a processor. The optical navigation module is adapted to generate coordinates of the pen mouse. The angle detector is adapted to detect an inclination angle of the pen mouse. The processor is electrically connected to the optical navigation module and the angle detector, and adapted to transform the inclination angle into a compensation parameter and further to compute a trace of the pen mouse via computation of the coordinates by the compensation parameter.

According to the claimed invention, the pen mouse further includes a memory electrically connected to the processor and stored transformation data related to the inclination angle and the compensation parameter. The transformation data is a predetermined table, and the predetermined table has a plurality of inclination angles and corresponding compensation parameters. The angle detector is a static detector or a kinetic detector. The static detector can be a three-axis accelerator and the kinetic detector can be a gyro.

The pen mouse of the present invention provides a tracing compensation function to calibrate deviation of original drawing. The present invention can utilize the angle detector to detect the inclination angles of the pen mouse relative to the reference plane. Transformation between the inclination angles and the compensation parameters can be preset and stored into the memory. The processor can rapidly read the compensation scale or the compensation formula to compute the product of the compensation parameter and the original coordinate displacement for forming the calibrated trace of the pen mouse. Inclination of the pen mouse can be detected in time for executing transformation, and the pen mouse can simply compute the trace via the coordinate displacement calibrated by the compensation parameter and the inclination angle, so that the pen mouse of the present invention is easy to handle and operate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
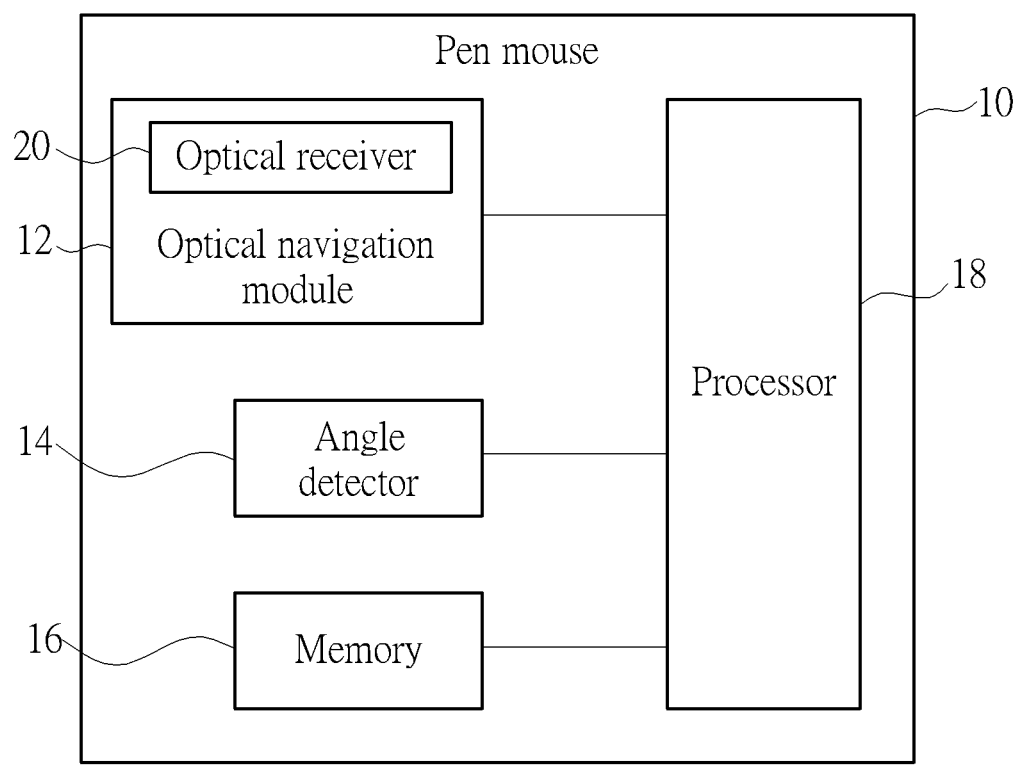
FIG. 1 is a functional block diagram of a pen mouse according to a first embodiment of the present invention.
Figure 2:
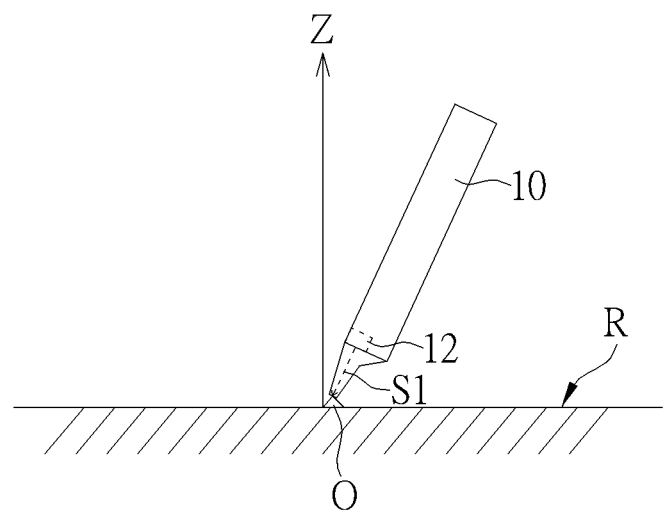
FIG. 2 is a diagram of the pen mouse according to the first embodiment of the present invention.

Please refer to FIG. 1 and FIG. 2. FIG. 1 is a functional block diagram of a pen mouse 10 according to a first embodiment of the present invention. FIG. 2 is a diagram of the pen mouse 10 according to the first embodiment of the present invention. The pen mouse 10 can include an optical navigation module 12, an angle detector 14, a memory 16 and a processor 18 electrically connected to each other. The optical navigation module 12 can be an optical navigator used to generate coordinates of the pen mouse 10 when the pen mouse 10 is actuated and moved over a reference plane R. In the first embodiment, the optical navigation module 12 can include an optical receiver 20. The optical receiver 20 is used to receive an optical navigating signal S1 reflected from an external object O. The external object O may be a particle positioned on the reference plane R. The optical navigation module 12 can analyze the optical navigating signal S1 and generate the coordinates accordingly.

Figure 3:
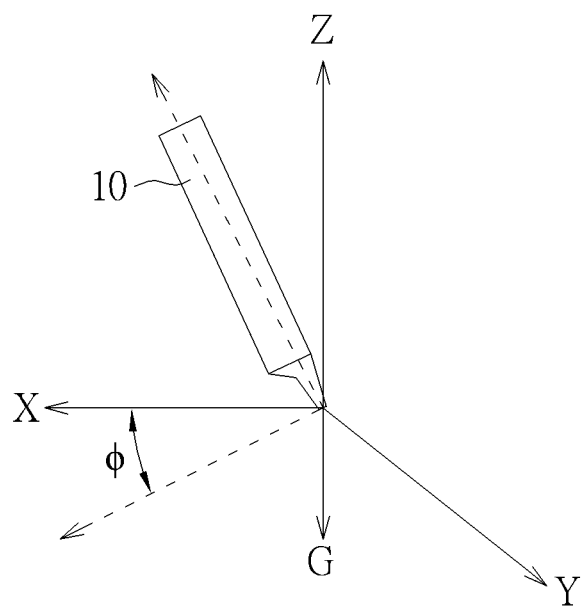
FIG. 3 is a diagram of the pen mouse sloped to an X axis according to the present invention.
Figure 4:
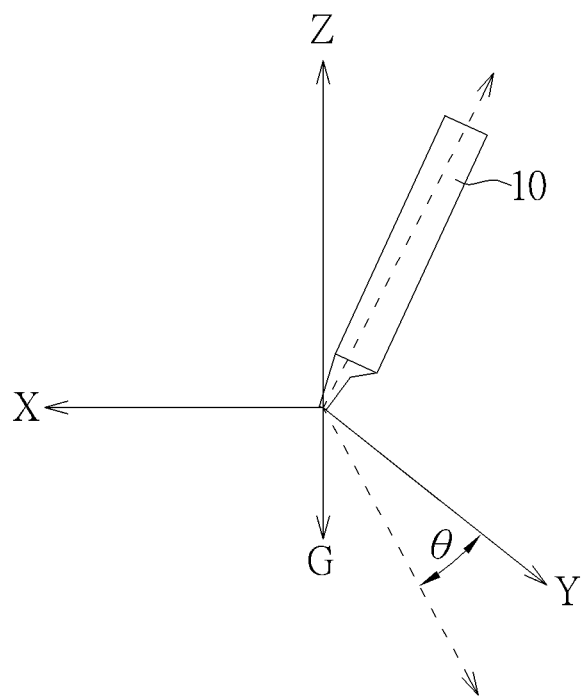
FIG. 4 is a diagram of the pen mouse sloped to a Y axis according to the present invention.
Figure 5:
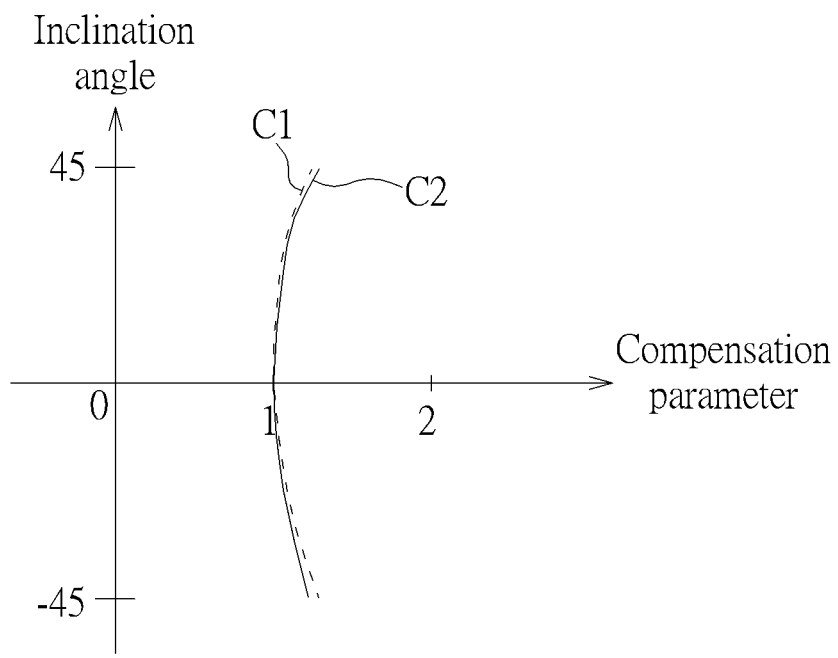
FIG. 5 is a diagram of curves about the transformation data according to the embodiment of the present invention.

The angle detector 14 can be a static detector or a kinetic detector. The static detector may be a three-axis accelerator and the kinetic detector may be a gyro. Application of the static detector and the kinetic detector is not limited to the above-mentioned embodiments, which depends on design demand. The angle detector 14 can detect at least one inclination angle $\theta$ or $\phi$ of the pen mouse 10 relative to the reference plane R. The memory 16 is an optional unit and can be used to store transformation data related to the inclination angles $\theta$ and $\phi$ and compensation parameter. Please refer to FIG. 3 to FIG. 5. FIG. 3 is a diagram of the pen mouse 10 sloped to an X axis according to the present invention. FIG. 4 is a diagram of the pen mouse 10 sloped to a Y axis according to the present invention. FIG. 5 is a diagram of curves C1 and C2 about the transformation data according to the embodiment of the present invention. The curve C1 is a trend of the inclination angles θ varied relative to the compensation parameter. The curve C2 is a trend of the inclination angles φ varied relative to the compensation parameter.

The processor 18 can receive the inclination angles θ and φ detected by the angle detector 14, and transform the inclination angles θ and φ into the compensation parameter via the transformation data stored inside the memory 16. Then, the processor 18 can compute a trace of the pen mouse 10 via computation of the coordinates by the compensation parameter. For example, the processor 18 can compute a plurality of products of coordinate displacement and the corresponding compensation parameters, and define the plurality of computed products as the trace of the pen mouse 10. As shown in FIG. 5, the compensation parameter is equal to 1.0 when the inclination angles θ and φ are equal to 0 degree, which means the original coordinate displacement is unnecessary to be calibrated. The compensation parameter is gradually increased in response to enlargement of the inclination angles θ and φ.

In the present invention, the processor 18 can be a control chip independent of the optical navigation module 12 and the angle detector 14. The processor 18 further can be a built-in unit integrated with the optical navigation module 12 or the angle detector 14, or can be an operating processor of a computer system (not shown in figures) independent of the optical navigation module 12 and the angle detector 14. The memory 16 can be an electric element independent of the processor 18, or can be a built-in unit integrated with the processor 18.

In this embodiment, the compensation parameter is a compensation scale. The compensation scale can be immediately computed when at least one of the inclination angles θ and φ are detected, or can be computed and stored into the memory 16 as a predetermined table before the pen mouse 10 is actuated. The said predetermined table may have a list filled with the inclination angles θ and φ and the related compensation parameters. Data in the curves C1 and C2 and the predetermined table are experimental values. In another possible embodiment, the compensation parameter can be a compensation formula. It is known that variation of the coordinates (such as the coordinate displacement) can be enlarged by the compensation parameter to generate the trace of the pen mouse 10, therefore, at least one of the small inclination angles θ and φ can be transformed into the small scale compensation formula for slighting adjusting the coordinates, and at least one of the large inclination angles θ and φ can be transformed into the large scale compensation formula for heavy adjustment of the coordinates.

As the detector 14 is the three-axis accelerator, acceleration in the X axis can be Ax, and acceleration in the Y axis can be Ay, and acceleration in the Z axis can be Az. The inclination angle φ can be computed by the formula 1 and the inclination angle θ can be computed by the formula 2. Then, the processor 18 can acquire the compensation parameter in accordance with the computed inclination angles θ and φ via the curves C1 and C2, and define the product of the original coordinate displacement and the compensation parameter as the calibrated trace.

$$\varphi = \tan^{-1}\left(\frac{Ax}{\sqrt{Ay^2 + Az^2}}\right) \quad \text{Formula 1}$$

$$\theta = \tan^{-1}\left(\frac{Ay}{\sqrt{Ax^2 + Az^2}}\right) \quad \text{Formula 2}$$

Figure 6:
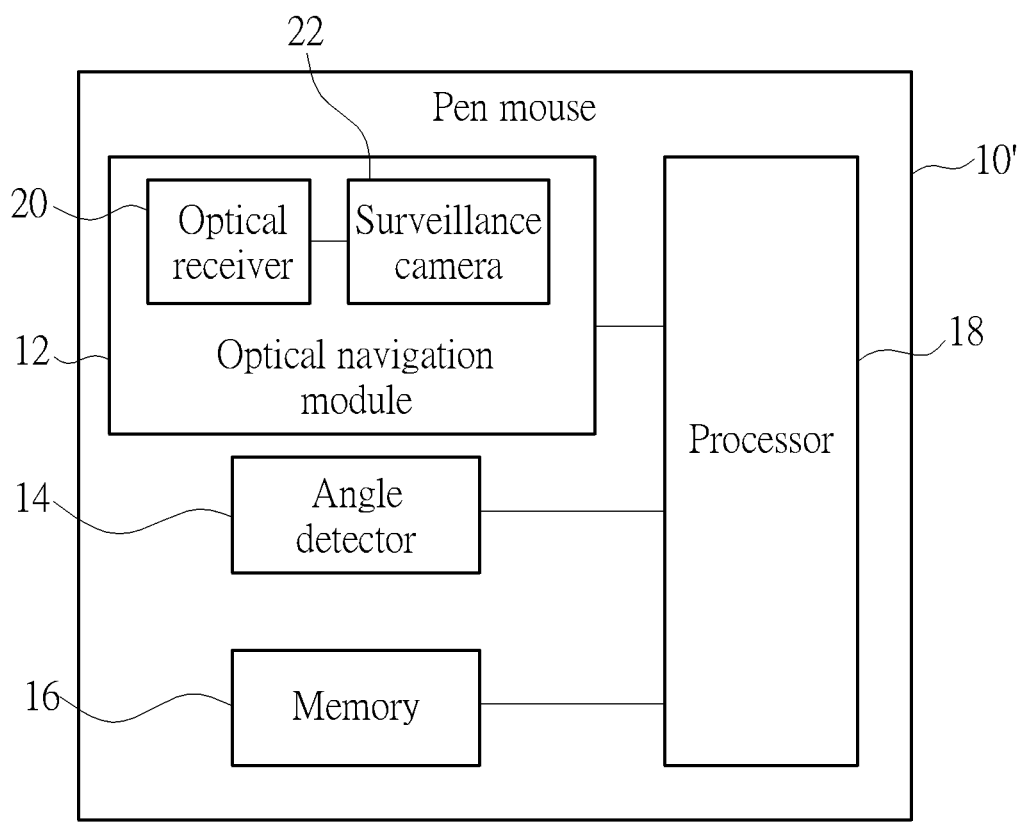
FIG. 6 is a functional block diagram of a pen mouse according to a second embodiment of the present invention.

Please refer to FIG. 6. FIG. 6 is a functional block diagram of a pen mouse 10' according to a second embodiment of the present invention. In the second embodiment, elements having the same numerals as ones of the first embodiment have the same structures and functions, and a detailed description is omitted herein for simplicity. Difference between the first embodiment and the second embodiment is that the optical navigation module 12 of the pen mouse 10' can include the optical receiver 20 and an optical emitter 22. The optical emitter 22 can output an optical navigating signal S1, and the optical receiver 20 can receive the optical navigating signal S1 to generate the coordinates accordingly.

The optical navigation module 12 can have a wakeup mode or a sleep mode, and the coordinates can be determined whether to compute the trace via the compensation parameter in response to a detection result of the angle detector 14. When the inclination angles θ and φ are smaller than a predefined angle (such as forty-five degrees), the optical navigation module 12 can be actuated to the wakeup mode and the processor 18 can compute the trace via the coordinates calibrated by the compensation parameter. When at least one of the inclination angles θ and φ exceeds the predefined angle, the coordinate displacement detected by the optical navigation module 12 is too large to be reliable, so that the processor 18 does not adjust the coordinates via the compensation parameter and the coordinates can be removed and not used to form the trace. As the angle detector 14 is the three-axis accelerator, the inclination angles θ and φ which exceed the predefined angle can be resulted from a status of some axis of acceleration detected by the three-axis accelerator being greater than a threshold. The said threshold may be preset according to the user's habit or a computed value.

Further, the optical navigation module 12 can be switched into the wakeup mode or the sleep mode in response to the detection result of the angle detector 14. The angle detector 14 can be the three-axis accelerator, and a predefined period is set to determine whether to switch modes of the three-axis accelerator. The inclination angles θ and φ continuously varied can represent that the pen mouse 10 is still operated by the user. When variation of the inclination angles θ and φ is paused in a short time (shorter than the predefined period), the user may hold the pen mouse 10 in a posture and the optical navigation module 12 can be kept in the wakeup mode for determining the coming coordinates. However, when a motionless condition of the inclination angles θ and φ exceeds the predefined period, which means at least one axis of unvaried acceleration is detected by the three-axis accelerator, the pen mouse 10 may be put away and the processor 18 can switch the optical navigation module 12 into the sleep mode for energy economy.

In conclusion, the pen mouse of the present invention provides a tracing compensation function to calibrate deviation of original drawing. The present invention can utilize the angle detector to detect the inclination angles of the pen mouse relative to the reference plane. Transformation between the inclination angles and the compensation parameters can be preset and stored into the memory. The processor can rapidly read the compensation scale or the compensation formula to compute the product of the compensation parameter and the original coordinate displacement for forming the calibrated trace of the pen mouse. Comparing to the prior art, inclination of the pen mouse can be detected in time for executing transformation, and the pen mouse can simply compute the trace via the coordinate displacement calibrated by the compensation parameter and the inclination angle, so that the pen mouse of the present invention is easy to handle and operate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pen mouse with a tracing compensation function, the pen mouse comprising:
   an optical navigator adapted to generate coordinates of the pen mouse;
   an angle detector adapted to detect an inclination angle of the pen mouse; and
   a processor electrically connected to the optical navigator and the angle detector and adapted to transform the inclination angle of the pen mouse into a compensation parameter in response to the inclination angle of the pen mouse not exceeding a predefined angle, and further to compute a trace of the pen mouse via computation of the coordinates by the compensation parameter;
   wherein the processor does not adjust the coordinates of the pen mouse via the compensation parameter when the inclination angle of the pen mouse exceeds the predefined angle.

2. The pen mouse of claim 1, further comprising:
   a memory electrically connected to the processor, wherein the memory stores transformation data related to the inclination angle of the pen mouse and the compensation parameter.

3. The pen mouse of claim 2, wherein the transformation data is a predetermined table having a plurality of inclination angles and corresponding compensation parameters.

4. The pen mouse of claim 1, wherein the compensation parameter is a compensation scale or a compensation formula.

5. The pen mouse of claim 1, wherein the optical navigator comprises an optical receiver adapted to receive an optical navigating signal reflected from an external object and then generate the coordinates of the pen mouse via analysis of the received optical navigating signal.

6. The pen mouse of claim 1, wherein the optical navigator comprises:
   an optical emitter adapted to output an optical navigating signal; and
   an optical receiver adapted to receive the optical navigating signal and generate the coordinates of the pen mouse via analysis of the received optical navigating signal.

7. The pen mouse of claim 1, wherein the angle detector is a static detector or a kinetic detector, the static detector is a three-axis accelerator and the kinetic detector is a gyro.

8. The pen mouse of claim 1, wherein variation of the coordinates of the pen mouse is enlarged by the compensation parameter to generate the trace of the pen mouse.

9. The pen mouse of claim 1, wherein the processor is integrated with at least one of the optical navigator and the angle detector, or is a control chip independent of the optical navigator and the angle detector, or is an operating processor of a computer system independent of the optical navigator and the angle detector.

10. The pen mouse of claim 1, wherein the optical navigator is switched into a wakeup mode or a sleep mode in response to a detection result of the angle detector.

11. The pen mouse of claim 10, wherein the processor switches the optical navigator into the sleep mode when a motionless condition of the inclination angle exceeds a predefined period.

12. The pen mouse of claim 10, wherein the angle detector is a three-axis accelerator, and the optical navigator is switched into the sleep mode in response to at least one axis of unvaried acceleration detected by the three-axis accelerator.

13. The pen mouse of claim 1, wherein the coordinates is determined to compute the trace of the pen mouse via the compensation parameter in response to a detection result of the angle detector.

14. The pen mouse of claim 13, wherein the angle detector is a three-axis accelerator, the coordinates of the pen mouse is removed and not used to compute the trace of the pen mouse in response to at least one axis of acceleration detected by the three-axis accelerator being greater than a threshold.

15. A pen mouse with a tracing compensation function, the pen mouse comprising:
   an optical navigator adapted to generate coordinates of the pen mouse;
   an angle detector adapted to detect an inclination angle of the pen mouse; and
   a processor electrically connected to the optical navigator and the angle detector and adapted to transform the inclination angle into a compensation parameter and further to compute a trace of the pen mouse via computation of the coordinates by the compensation parameter;
   wherein the angle detector is a three-axis accelerator, the coordinates of the pen mouse is removed and not used to compute the trace of the pen mouse in response to at least one axis of acceleration detected by the three-axis accelerator being greater than a threshold.

* * * * *